United States Patent [19]

Grataloup

[11] 4,073,439
[45] Feb. 14, 1978

[54] METHOD AND APPARATUS FOR PNEUMATICALLY SPREADING PARTICULATE SUBSTANCES

[75] Inventor: Xavier Roger Grataloup, Montereau, France

[73] Assignee: Societe Anonyme Dite: Nodet-Gougis, Montereau, France

[21] Appl. No.: 675,927

[22] Filed: Apr. 12, 1976

[30] Foreign Application Priority Data

Apr. 14, 1975 France .................. 75 11568

[51] Int. Cl.² ............................................. A01C 15/04
[52] U.S. Cl. .................................. 239/655; 239/664; 239/502; 239/523
[58] Field of Search ................ 239/1, 8, 150, 163, 239/654, 655, 664, 670, 689, 499, 502, 520–523, 500, 565; 222/193, 394, 400.7; 302/28, 59, 63

[56] References Cited

U.S. PATENT DOCUMENTS

| | | | |
|---|---|---|---|
| 2,893,741 | 7/1959 | Pilch | 239/655 |
| 3,331,607 | 7/1967 | Sammarco | 239/664 |
| 3,567,120 | 3/1971 | Suda | 239/655 X |
| 3,568,937 | 3/1971 | Grataloup | 239/655 |

FOREIGN PATENT DOCUMENTS

531,465  8/1931  Germany .................. 302/59

Primary Examiner—John J. Love
Assistant Examiner—Andres Kashnikow
Attorney, Agent, or Firm—Diller, Brown, Ramik & Wight

[57] ABSTRACT

Method and apparatus for pneumatically spreading a particulate substance for treating the ground. The particulate substance is blown from a hopper through tubes to distribution points. A nozzle is received on the outlet end of each tube. The flow is divided in the nozzle into several parts which are concentrated in inverted chute-like of different lengths and then sprayed towards the ground, perpendicular thereto in the central zone and progressively more obliquely towards the marginal zones. The central zones are covered with a uniform amount of particulate substance which decreases in the marginal zones stepwise or uniformly. The marginal zones of consecutive adjacent passes overlap each other. Various ways of decreasing the distribution of the particulate substance in the marginal zones are described.

6 Claims, 10 Drawing Figures

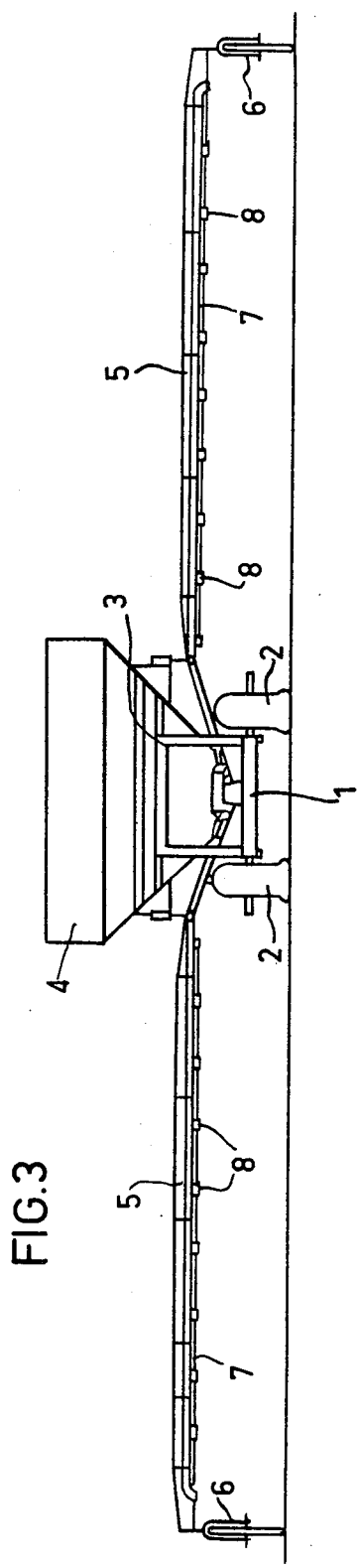
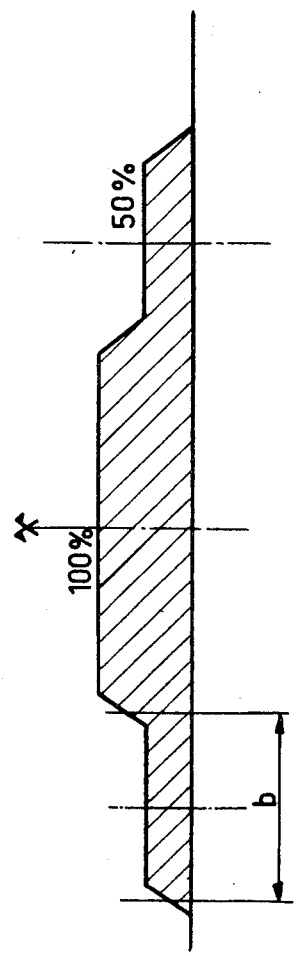
FIG.3
FIG.8

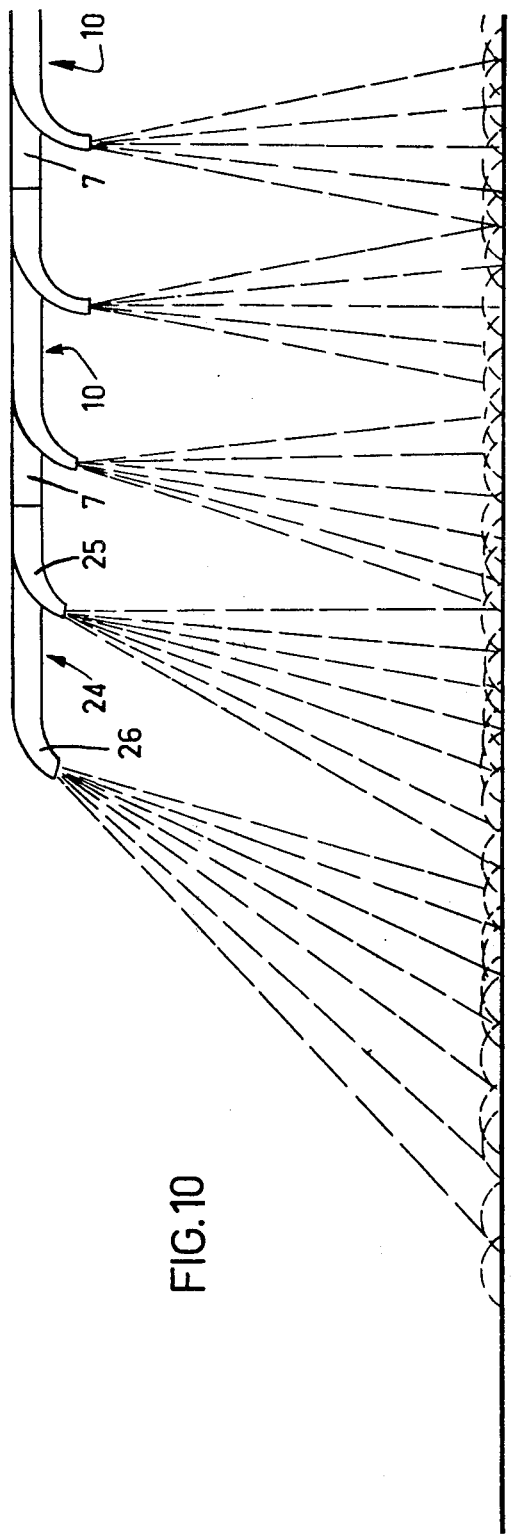
FIG.10
FIG.9

METHOD AND APPARATUS FOR PNEUMATICALLY SPREADING PARTICULATE SUBSTANCES

The present invention relates to a method and apparatus of pneumatically spreading particulate substances.

The invention more particularly relates to pneumatically spreading substances for treating the soil, such as fertilizers, weedkillers and insecticides.

In spreaders known at the present, the substance to be spread is conveyed pneumatically through tubes of different lengths from a central hopper to regularly laterally spaced distribution points; the streams of blown particulate substances are concentrated and directed at dispersing surfaces which break up the streams of sprayed particles which fall in a shower to the ground, the particles of substance bouncing off the dispersing surfaces and following parabolic trajectories to the ground.

The distribution of substances spread in this way is subject to numerous irregularities originating in the dispersing surfaces.

In fact, variations in the physical properties of the particulate substance are a reason why the dispersion of the particles off the dispersing surfaces is not uniform. Similarly, the swaying and jerking of the apparatus in the field affects the distribution of the particles because the particles of the substance have parabolic trajectories after dispersion, and the vertical distance of the drop point from the dispersing surface is a function of its height above the ground, which varies constantly. Furthermore, the particles of the substance are that much more affected by wind since they lose kinetic energy during their impact with the dispersing surface, their trajectories are long, and thereafter they fall under the sole force of gravity. Lastly, the dispersing surfaces may be accidentally deformed which considerably alters the trajectories of the particles after their impact with the dispersing surfaces.

All of the above sources of irregularities increase the variations in the distribution of the substance across the transverse extent of a spreading pass.

Another source of irregularities in the distribution of the substance along the ground is due to poor transitions between consecutive adjacent passes of the spreading apparatus or machine.

In fact, at the present time, spreading machines spread the substances in a single pass according to a curve of distribution which drops off abruptly at both sides, the amounts of the substance deposited on the ground varying between a mean value in the central zone of the pass to practically nil over a small marginal zone $a$ as shown in FIGS. 1 and 2.

With present-day spreading machines being about 12 meters wide or more, and even with rather precise markings on the ground, it is very difficult to achieve inter-pass voids less than a width $a$ such that the amount of the substance deposited in the transition zones between successive passes is very irregular, varying between practically zero when the center lines of two successive passes are spaced more than the width of a pass (FIG. 1) and double the mean deposited amount when two successive adjacent passes overlap (FIG. 2).

An object of the invention is to reduce variations in the distribution of the spread substance along the width of a given pass as well as in the transition zone between two successive adjacent passes.

The method of pneumatically spreading particulate substances for treating the soil according to the present invention consists in spraying the substance from distribution points directly onto the ground in sprays directed substantially perpendicular thereto and spaced sufficiently closely to one another that the substance is uniformly deposited on the ground along the entire transverse extent of the spreading pass.

In order to improve the distribution of the substance in the transition zones, the substance is distributed in stepwise or uniformly reduced amounts in the marginal zones of the transverse extent of the spreading pass so as to evenly spread the substance on the ground in the transition zones; the inter-pass spacing between two successive adjacent passes is such that the marginal zones overlap.

Given the fact that the substance is sprayed directly on the ground, it is necessary to space the sprays sufficiently close together so that the substance is substantially uniformly spread at all points along the entire transverse extent of the spreading pass. Now, for reasons of savings in construction and of reducing the bulk of the apparatus, it is desirous not to increase the number of supply tubes so that there is one for each distribution point. Accordingly, the required number of distribution points per tube may be multiplied by providing at the outlet end of each means for dividing the stream of particulate substance into several parts for concentrating such parts in an equal number of separate sprays and for directing them down toward the ground. Said means are preferably deflectors of different lengths terminated in a curved portion or elbow oriented toward the ground.

With the present method and apparatus, by elimination of conventional dispersing surfaces, and spraying the substance directly on the ground, one also eliminates the main causes of uneven distribution as discussed above; in fact, the position of the particle drop points is not substantially affected by the swaying or bouncing of the apparatus, the particles rebounding off the ground. By eliminating the dispersing surfaces the trajectories of the particles are unaffected by variations in the physical properties of the particulate substance. Similarly, the wind has practically no effect on the particles sprayed on the ground as they have sufficient kinetic energy so as not to be blown off the shortest rectilinear trajectories by the wind.

Finally, the spreading of the particles in the marginal zones of the spreading pass enables them to overlap without the deposited amounts of the substance varying very greatly.

A preferred embodiments of the apparatus according to the invention will now be described in detail, by way of example only, with reference to the accompanying drawings in which:

FIG. 3 is an end elevational view of preferred embodiment of the spreading machine according to the invention;

FIG. 8 shows distribution curves with deposited amounts decreasing stepwise in the marginal zones of the spreading pass;

FIG. 9 shows a distribution curve with deposited amounts uniformly diminishing in the marginal zones of the spreading pass; and FIG. 10 shows a particular nozzle arrangement for a attaining a distribution curve as shown in FIG. 9.

Figure 1:
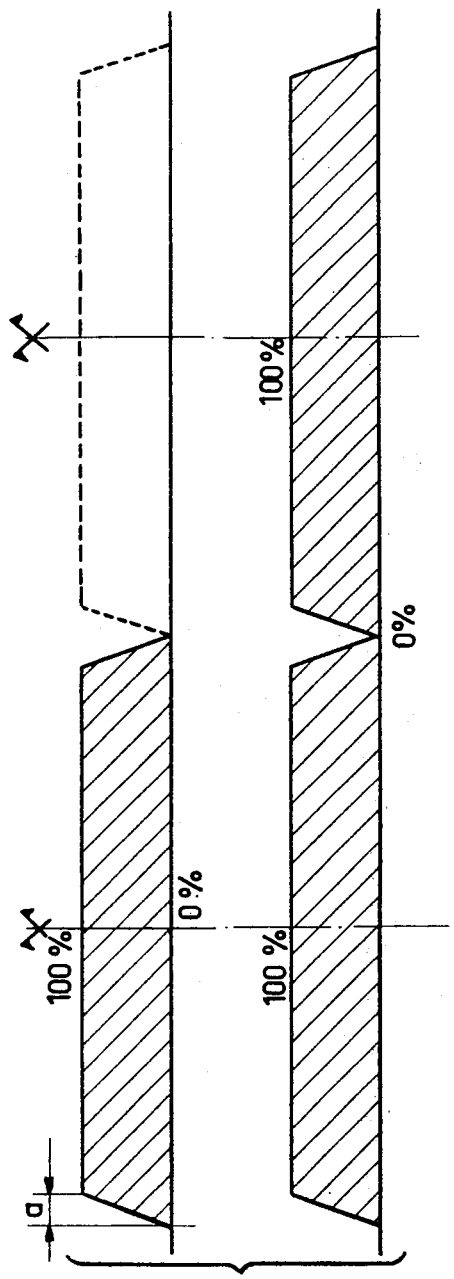
FIG. 1 shows distribution curves for conventional spreading of a particulate substance, in two successive adjacent passes of a spreading machine leaving a void therebetween.
Figure 2:
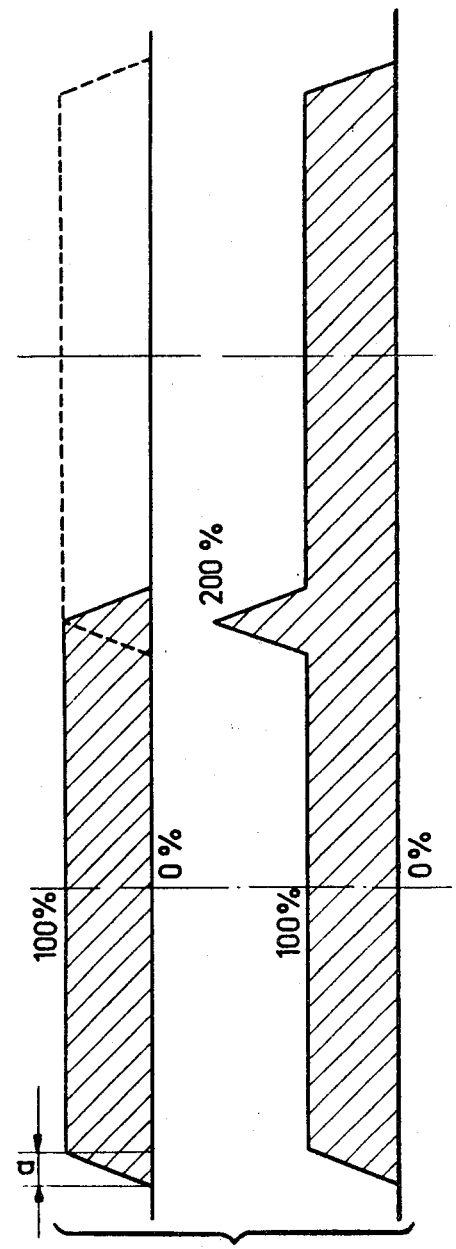
FIG. 2 shows distribution curves for conventional spreading of a particulate substance where two successive adjacent passes overlap.
Figure 4:
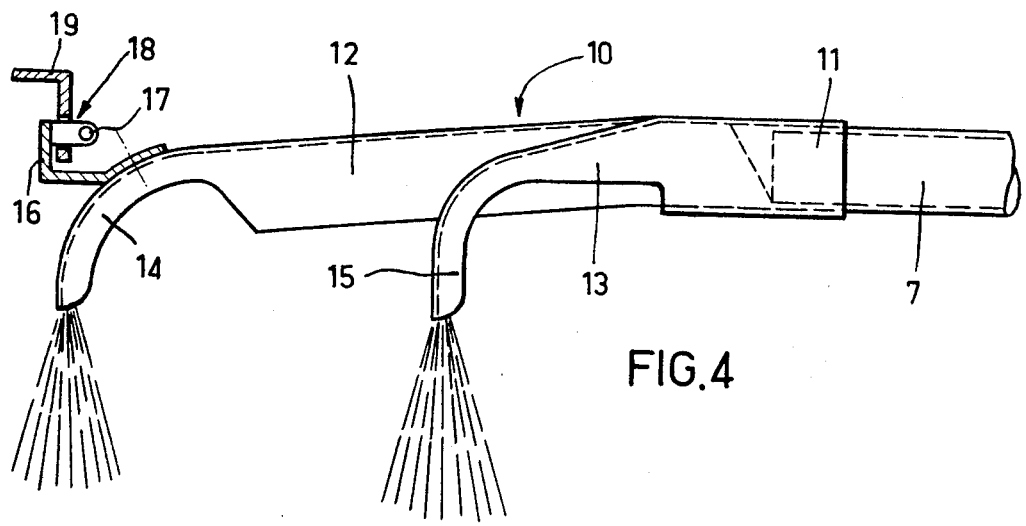
FIG. 4 is a detail, on an enlarged scale, of a nozzle of the present spreading machine.
Figure 5:
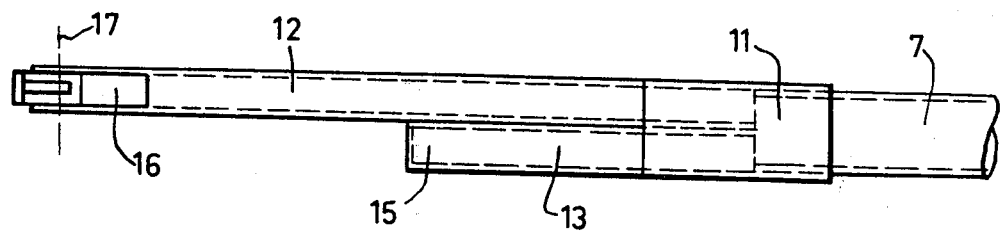
FIG. 5 is a top plan view of the nozzle shown in FIG. 4.
Figure 6:
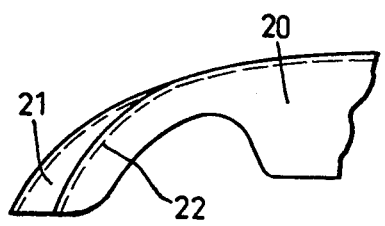
FIG. 6 is a detail, on an enlarged scale, of a deflector for a marginal zone.
Figure 7:
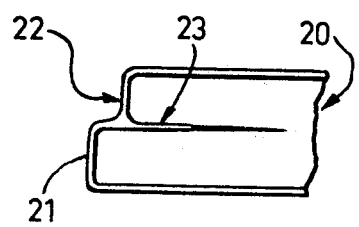
FIG. 7 is a bottom plan view of the deflector in FIG. 6.

The towed pneumatic spreading apparatus in FIG. 3 comprises a vehicle frame 3 carried by an axle 1 on which wheels 2 are rotatably mounted; the frame 3 supports a central hopper 4 and two lateral reinforced arms 5 one disposed to each side of the apparatus. Each lateral arm 5 is supported at its outer end by a wheel 6 and bears a bundle of straight supply tubes 7 of different lengths for carrying the particulate substance in a compressed air stream supplied by a source of compressed air, from the central hopper to the distribution points 8 where the particular substance is sprayed directly onto the ground to be treated.

In the case of a tractor-mounted spreading apparatus, the structure is similar except for the axle 1 and the wheels 2 and 6, the spreading apparatus being carried at the rear of the tractor.

A nozzle 10 is mounted, removably or not, at the outlet end of each of the supply tubes 9 (FIG. 4) The nozzle is simply slid on the end of the tube and secured against movement by means of a fastening lug 16 and a pin 17 in a slot 18 of a part 19 fixed to the arm of the spreading apparatus. Each nozzle comprises a securing sleeve portion 11 adapted to be received on the end of the tube 7 and possibly tightened thereon by a clamping ring (not shown) and two deflectors 12 and 13 of different length disposed side by side and each of chute-like configuration terminating in an elbow or curved portion 14,15 directed perpendicular to the ground, the inverted U-shaped cross section of the chutelike deflectors facilitates their cleaning.

It will be noted that the curved portions or elbows in the deflectors have a radius of curvature sufficiently large to avoid interference with the flow of the particulate substance which is guided toward the ground, the stream of particular material carried by the tube 7 being divided into two equal parts at the outlet thereof by the median wall separating the two deflectors, each part of the compressed air stream of particulate material being concentrated in curved portion or elbow for forming a spray directed towards the ground.

FIGS. 6 and 7 show another deflector 20 which has a double curved deflecting surfaces 21,22 separated by a median wall member 23, said double curved deflecting surfaces directing the flow of the particulate substance in two angularly spaced directions which makes a wider spray leaving the elbow. Such a deflector 20 is preferably used for the marginal zones to compensate for the divergence of the trajectories and to obtain a satisfactory distribution of the particulate substance on the ground. The distribution curve of the particulate substance sprayed in this way diminishes from the central zone of the spreading pass towards the marginal zones thereof stepwise illustrated in FIG. 8 or uniformly as illustrated in FIG. 9.

This type of distribution diminishing in the marginal zones may be achieved either by reducing the flow of the particulate substance sprayed in the marginal zones of the spreading pass or by increasing the spacing between the distribution points spraying the marginal zones and then by marginal sprays covering a wider zone of the spreading pass, for example, by means of a double curved deflectors such as illustrated in FIGS. 6 and 7 or by gradually angling the axis of the sprays more obliquely with respect to the ground and for the marginals zones of the spreading pass as shown in FIG. 10.

The nozzle arrangement shown in FIG. 10 comprises nozzles 10 of the type shown in FIG. 4 in the central zone of the spreading pass and slightly modified nozzles 24 at the ends of the arrangement having deflectors 25 and 26 obliquely inclined with respect to the axis of the sleeve portion thereof so as to project obliquely an enlarged spray of the particulate substance towards the ground thereby spreading out the distribution, the deflectors being formed as the deflector of FIG. 6.

So as to uniformly distribute the particulate substance on the ground, and avoid voids, the distance between consecutive deflectors is less that 30 cm and preferably equal to about 25 cm.

The present invention is of course not limited to the preferred embodiments described hereinabove by way of example only, but covers all modifications, variations and equivalents within the scope of the appended claims.

Thus in case of a precise marking out, identical nozzles may be used along the entire transverse extent of the spreading pass, directing sprays of the particulate substance perpendicular to the ground at all distribution points; distribution curves such as shown in FIGS. 1 and 2 would then be obtained.

What is claimed is:

1. A pneumatic spreading apparatus for a particulate substance for treating the ground, said apparatus comprising a hopper for the particulate substance, a source of compressed air connected to said hopper and providing a blown stream of the particulate substance, a plurality of tubes connected to said hopper and conveying a flow of the blown stream of the particulate substance to distribution points spaced axially with respect to said tubes, said tubes having outlet ends remote from said hopper, and flow control means at the outlet end of each tube for dividing the flow of the particulate substance into several axially off-set separate parts, each flow control means comprising a nozzle defining flow paths and having a portion secured to its associated tube and at least two separate flow guiding surfaces extending side-by-side in positively stepped relation transversely of the flow paths with adjacent portions of said two guiding surfaces transversely of said nozzle being spaced at different lengths beyond said portion, said guiding surfaces having their extremities curved towards the ground and forming elbows.

2. A pneumatic spreading apparatus according to claim 1, wherein all of said nozzles are identical, and outlet portions of said elbows are perpendicular to the ground.

3. A penumatic spreading apparatus according to claim 1, wherein certain of said nozzles are positioned for supplying marginal zone distribution points, and said certain nozzles have outlet portions of said elbows directed obliquely toward the ground.

4. A penumatic spreading apparatus according to claim 3, wherein said guiding surfaces of said nozzles supplying marginal zone distribution points have two different curves for widening the spray.

5. A pneumatic spreading apparatus according to claim 1, wherein outlet ends of two consecutive guiding surfaces are positively spaced but at a distance less than about 30 cm.

6. A pneumatic spreading apparatus for a particulate substance for treating the ground, said apparatus comprising a hopper for the particulate substance, a source of compressed air connected to said hopper and providing a blown stream of the particulate substance, a plurality of tubes connected to said hopper and conveying a flow of the blown stream of the particulate substance to distribution points spaced axially with respect to said tubes, said tubes having outlet ends remote from said hopper, and flow control means at the outlet end of each tube for dividing the flow of the particulate substance into several axially offset separate parts, each flow control means comprising a nozzle having a portion secured to its associated tube and at least two separate flow guiding surfaces extending side-by-side in stepped relation at different lengths beyond said portion, said nozzle portion being a tubular sleeve, and said two separate guiding surfaces being separately functioning deflectors of different lengths and including separate sleeve portions disposed side-by-side, each deflector having a chute-like configuration pointed at the ground and forming an elbow.

* * * * *